(12) United States Patent
Hamamura et al.

(10) Patent No.: US 6,420,477 B1
(45) Date of Patent: Jul. 16, 2002

(54) AQUEOUS COATING COMPOSITION FOR METAL SHEETS, SURFACE-TREATED METAL SHEETS AND SURFACE TREATING METHOD

(75) Inventors: Kazunari Hamamura, Sagamihara; Ryoji Morita, Hiratsuka, both of (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 0 days.

(21) Appl. No.: 09/570,494

(22) Filed: May 12, 2000

(51) Int. Cl.[7] .............................. C08J 3/00; C08K 3/20; C08L 75/00; B05D 3/02; B32B 27/00
(52) U.S. Cl. .................. 524/589; 427/372.2; 427/385.5; 428/423.1; 524/507; 524/589; 524/591; 524/839; 524/840; 525/123; 525/455
(58) Field of Search .................. 524/507, 591, 524/839, 840, 589; 525/123, 455; 428/423.1; 427/372.2, 385.5

(56) References Cited

U.S. PATENT DOCUMENTS 5,556,912 A * 9/1996 Brock et al. ................. 524/507
6,239,209 B1 * 5/2001 Yang et al. .................. 524/507

FOREIGN PATENT DOCUMENTS

| EP | 0 480 251 | 4/1992 |
|---|---|---|
| EP | 0 687 715 | 12/1995 |
| JP | 07195031 | 8/1995 |
| JP | 07228828 | 8/1995 |
| JP | 08127735 | 5/1996 |

* cited by examiner

*Primary Examiner*—Patrick D. Niland
(74) *Attorney, Agent, or Firm*—Nixon & Vanderhye

(57) ABSTRACT

An aqueous coating composition for metal sheets which comprises, as indispensable components, the following (C) alone or two or more of the following (A), (B) and (C), and water, and does not contain a photopolymerization initiator:

(A) a polyurethane resin having an elongatedness of dry film of 100% or more (excluding the following (C))

(B) a synthetic resin having at least one ethylenic double bond (excluding the following (C))

(C) a polyurethane resin having an elongatedness of dry film of 100% or more and having at least one ethylenic double bond, and surface-treated metal sheets and a surface-treating method for metal sheets using the composition. The composition can form film having good adhesion of UV-curable paints, UV-curable inks or UV-curable adhesives, in addition to good corrosion resistance, good formability and good durability with injury. The composition may contain (D) a water dispersible wax or (E) water insoluble fine particles having a Mohs hardness of 2.5 or more for further improvement of the physical properties.

9 Claims, No Drawings

AQUEOUS COATING COMPOSITION FOR METAL SHEETS, SURFACE-TREATED METAL SHEETS AND SURFACE TREATING METHOD

BACKGROUND OF THE INVENTION

1. Field of the Invention

This invention relates to an aqueous coating composition for metal sheets, and surface-treated metal sheets and a surface treating method using the same. More detailedly, this invention relates to an aqueous coating composition capable of forming a film giving good adhesion of UV-curable paints, UV-curable inks or UV-curable adhesives, corrosion resistance, formability, and durability with injury when applied onto the surface of a metal sheet, and surface-treated metal sheets and surface treating method for metal sheets using the same.

2. Statement of Related Art

Workpieces and formed products using metal sheets, for example aluminum or aluminum alloy sheets have hitherto been utilized in broad fields, and there are many techniques for forming resin film on their surfaces in order to give formability, corrosion resistance, durability with injury, etc. For example, JP-A-8/127735 discloses an aluminum sheet for lubricating treatment which comprises an aluminum sheet having chromate film provided thereon and having lubricity film composed of a water dispersion-type polyurethane resin, particles of a silicon compound and a lubricant formed on the chromate film, JP-A-7/228828 discloses a resin-coated aluminum alloy material excellent in lubricity and excellent in corrosion resistance which makes press forming of strong processing possible, produced by forming resin film using a composition wherein particles of a polyethylene wax are dispersed in a resin. Further, JP-A-7/195031 discloses, as a surface-treated aluminum sheet material capable of having excellent formability and durability with injury, a surface-treated aluminum sheet material having a friction coefficient controlled to be 0.15 or less, which comprises an aluminum alloy sheet material having a coating containing 5 to 40% $SiO_2$ having a particle size of 0.1 μm or less and 5 to 60% a lubricant applied thereon with a thickness of 0.5 to 10 μm.

All these metal sheets of prior art are materials having good formability, corrosion resistance, etc. given by forming resin film containing a lubricant such as wax particles, and as to painting adhesion after formation, it is mentioned that painting adhesion can be ensured by anchor effect by pinholes in JP-A-7/228828, by specifying especially the combination of the particle size of the silicon compound in the lubrication treating agent, the kind and compounding amount of the lubricant and the particle size of the resin wax in JP-A-8/127735, and by limiting the amount of film formed on the surface in JP-A-7/195031.

In recent years, from compliance with controls on solvent effluence and advantages of work, cases where as paints for top coating or inks, UV-curable ones are used have been increasing. However, in UV-curable top coating, the volumetric shrinkage rate between before and after curing is large due to radical polymerization, and as a result, the cured film has remaining large internal stress. Therefore, the film of UV-curable top coatings is inferior to the film of usual solvent-type or aqueous top coatings in adhesion to the base material, and there arise many cases where base material design taking UV-curable top coatings into account is made necessary. The surface of sheets treated by the above-exemplified prior art is often poor in adhesion of UV-curable top coatings.

DESCRIPTION OF THE INVENTION

Object of the Invention

As stated above, film satisfying adhesion of UV-curable top coatings has not been obtained by usual surface treating methods wherein resin film is formed for giving formability, corrosion resistance, durability with injury, etc. onto the surface of metal sheets. This invention aims to solve this problem, and provides such an aqueous coating composition appliable to the surface of metal sheets such as aluminum or aluminum alloy sheets that the coating film shows good adhesion of UV-curable top coatings, in addition to the above various characteristics, and surface-treated metal sheets and a surface treating method for metal sheets using the same.

SUMMARY OF THE INVENTION

The invention for solving the above problem relates to an aqueous coating composition for metal sheets which comprises, as indispensable components, the following (C) alone or two or more of the following (A), (B) and (C), and water, and does not contain a photopolymerization initiator:

(A) a polyurethane resin having an elongatedness of dry film of 100% or more (excluding the following (C))

(B) a synthetic resin having at least one ethylenic double bond (excluding the following (C))

(C) a polyurethane resin having an elongatedness of dry film of 100% or more and having at least one ethylenic double bond.

The invention also relates to a metal sheet having thereon film formed by applying and drying the aqueous coating composition.

The invention also relates, as a method for effectively using the above aqueous coating composition for metal sheets, to a surface treating method for a metal sheet which comprises coating the surface of a metal sheet with the aqueous coating composition for metal sheets, drying the applied composition and forming a film of a UV-curable paint, a UV-curable ink or a UV-curable adhesive on the whole or part of the resultant surface.

The invention also relates to a metal sheet having thereon composite film formed by the surface treating method.

When the composition and the surface treating method are used, good adhesion of UV-curable top coatings is obtained in addition to good formability, good corrosion resistance and good durability with injury.

When, in the composition and method, the composition contains (D) a water dispersible wax in the range of 0.1 to 20% by weight of the total solid components, good formability in strong forming is obtained in addition to the above various characteristics, and when the composition contains (E) a water insoluble fine particles having a Mohs hardness of 2.5 or more in a rate of 30% by weight or less of the total solid components, better durability with injury is obtained in addition to the above various characteristics.

DESCRIPTION OF PREFERRED EMBODIMENT

The invention is detailedly described below. In the invention, (A) the polyurethane resin having an elongatedness of dry film of 100% or more is assumed to mean such a polyurethane resin that when an aqueous dispersion thereof is applied onto a support sheet, dried at room temperature for 24 hours and further dried at 120° C. for 10 minutes, and the resultant dry film (150 μm thick×10 mm wide) is stretched at 300 mm/min, elongatedness at breaking is 100% or more. When the elongatedness is less than 100%, the film is poor in following characteristic to deformation in the case where the metal sheet after the coating and drying is processed, and cracks are liable to be generated at the processed part, and thereby corrosion resistance lowers. The upper limit of the elongatedness is not particularly limited, but when it goes beyond 800%, film hardness generally gets too low and the practical range gets narrow in durability with injury, and the elongatedness is preferably 800% or less.

As the above polyurethane resin, general polyurethane resins can be used so long as the elongatedness is satisfied. Namely, the above polyurethane resin of the invention can be a polyurethane resin obtained by polyaddition reaction between a polyisocyanate having two or more (usually two) isocyanato groups and a polyol having two or more (usually two) hydroxyl groups.

As the polyisocyanate, aromatic, alicyclic and aliphatic polyisocyanates are mentioned, and, specifically, aromatic polyisocyanates include tolylene diisocyanate (TDI)(2,4- or 2,6-TDI), diphenylmethane diisocyanate (MDI)(4,4'- or 2,4'-MDI), polymeric MDI, xylylene diisocyanate (XDI), naphthylene diisocyanate (NDI)(usually 1,5-NDI), paraphenylene diisocyanate (PPDI), tetramethylxylylene diisocyanate (TMXDI), tolidine diisocyanate (TODI), 3,3'-dimethoxy-4,4'-biphenylene diisocyanate, etc., alicyclic polyisocyanates include dicyclohexylmethane diisocyanate (HMDI)(4,4'- or 2,4'-HMDI), isophorone diisocyanate (IPDI), isopropylidene-bis-(4-cyclohexylisocyanate)(IPC), hydrogenated xylylene diisocyanate (hydrogenated XDI), cyclohexylene diisocyanate (CHPI)(usually 1,4-CHPI), 1,5-tetrahydonaphthalene diisocyanate, etc., and the aliphatic polyisocyanates include hexamethylene diisocyanate (HDI), lysine diisocyanate (LDI), tetramethylene diisocyanate, etc.

As the polyol, there can, usually, be mentioned (poly)alkylene glycols, polyester polyols, polyols having C—C bonds as the principal chain and other polyols.

The (poly)alkylene glycols include (poly)ethylene glycols (ethylene glycol, diethylene glycol, triethylene glycol, etc.), 1,2-propylene glycol, 1,3-propylene glycol, polyethylen/propylene glycol, neopentyl glycol, 1,2-butylene glycol, 1,3-butylene glycol, 1,4-butylene glycol, 3-methyl-1,5-pentanediol, hexamethylene glycol, etc.

The polyester polyols include polyester polyols having hydroxyl groups at the ends obtained by polycondensation between low molecular weight polyols such as (poly)alkylene glycols as mentioned above, bisphenol A, hydrogenated bisphenol A, trimethylolpropane or glycerol and polybasic acids such as succinic acid, glutaric acid, adipic acid, sebacic acid, phthalic acid, isophthalic acid, terephthalic acid, trimellitic acid, tetrahydrophthalic acid, endomethylenetetrahydrophthalic acid or hexahydrophthalic acid.

The polyols having C—C bonds as the principal chain include, for example, methyl (meth)acrylate-vinyl alcohol copolymers, polyolefins such as polyethylene or polypropylene having hydroxyl groups at both ends, partial or complete hydrolyzates of ethylene-vinyl acetate copolymers, etc.

The other polyols include, for example, bisphenol A, hydrogenated bisphenol A, trimethylolpropane, glycerol, etc.

The molecular weight of the polyurethane resin having an elongatedness of dry film of 100% or more of (A) used in the invention is preferably on the order of 500 to 1,000,000 when measured by gel permeation chromatography. As the polyurethane resin having an elongatedness of dry film of 100% or more of (A), it is also possible to use, as commercial products, HYDRAN HW-340 (water dispersion of a polyester polyol-type polyurethane resin, elongatedness 280%, made by DAINIPPON INK AND CHEMICALS, INC.), HYDRAN HW-312B (water dispersion of a polyalkylene glycol-type polyurethane resin, elongatedness 700%, made by DAINIPPON INK AND CHEMICALS, INC.), HYDRAN HW-950 (water dispersion of a polyester polyol-type polyurethane resin, elongatedness 120%, made by DAINIPPON INK AND CHEMICALS, INC.), PERMARIN UA-110 (water dispersion of a polyalkylene glycol—type polyurethane resin, elongatedness 500%, made by SANYO CHEMICAL INDUSTRIES, LTD.), PERMARIN UA-310 (water dispersion of a polyester polyol-type polyurethane resin, elongation 420%, made by SANYO CHEMICAL INDUSTRIES, LTD.), etc.

As the synthetic resin having at least one ethylenic double bond of (B) used in the invention, there can be mentioned synthetic resins such as epoxy-series resins, polyester-series resins or polyurethane-series resins having at least one, preferably two or more ethylenic double bonds, and diallyl phthalate-series resins.

As the epoxy-series resins having at least one ethylenic double bonds, there can be mentioned a bisphenol-type epoxy resin-series ethylenic double bond-containing resin obtained by adding an ethylenic double bond-containing monocarboxylic acid (e.g., acrylic acid, methacrylic acid, crotonic acid, etc.) to a bisphenol-type epoxy resin having epoxy groups at both ends formed through the reaction between the epoxy groups and the carboxyl groups, the epoxy resin being formed by polycondensation and polyaddition between bisphenol A, bisphenol F or hydrogenated bisphenol A or a mixture at any combination of bisphenol A, bisphenol F and hydrogenated bisphenol A and epichlorohydrin. Typical examples thereof include bisphenol A-type epoxy resin-series ethylenic double bond-containing resins represented by the following general formula obtained by using bisphenol A and (meth)acrylic acid in the above.

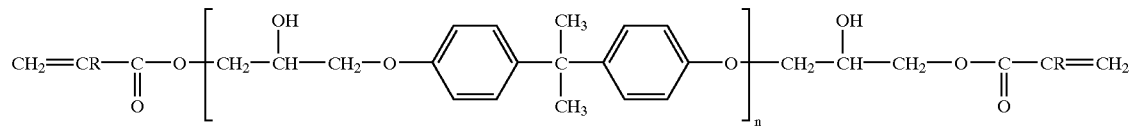

(wherein R represents a hydrogen atom or a methyl group and n represents a polymerization degree)

The molecular weight of the above bisphenol-type epoxy resin-series ethylenic double bond-containing resins is preferably on the order of 600 to 1,000,000 when measured by gel permeation chromatography.

As the polyester-series resins having at least one ethylenic double bond, there can be used usual unsaturated polyester resins obtained by polycondensation between unsaturated dicarboxylic acids or anhydrides thereof (maleic acid, fumaric acid, itaconic acid, maleic anhydride, fumaric anhydride, etc.) and glycols (ethylene glycol, propylene glycol, 1,3-butylene glycol, 1,6-hexanediol, di- or triethylene glycol, neopentyl glycol, hydrogenated bisphenol A, etc.). The unsaturated polyester resins can also be ones wherein part of the above unsaturated dicarboxylic acids are replaced by phthalic acid, isophthalic acid, succinic acid or the like.

As the polyester-series resins having at least one ethylenic double bond, there can also be used resins obtained by polyaddition and polycondensation or merely polyaddition between glycidyl (meth)acrylate and alkadienoic acids (succinic acid, adipic acid, etc.) or anhydrides thereof or alkedienoic acids (maleic acid, fumaric acid, etc.) or anhydrides thereof through the glycidyl groups and the carboxyl groups.

As the polyester-series resins having at least one ethylenic double bond, there can also be used methacrylic acid dimer-polyol copolymers represented by the following general formula.

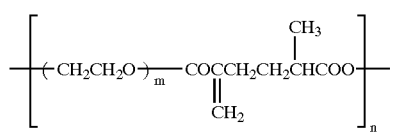

(wherein m represents an integer of 1 to 3 and n represents a polymerization degree)

As the polyester-series resins having at least one ethylenic double bond, there can also be used 2,3-dimethyl-1,3-butadiene-modified bisphenol A propoxide fumarate polyester resins represented by the following general formula.

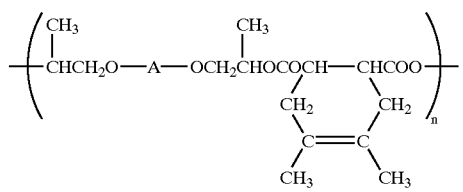

(wherein A represents

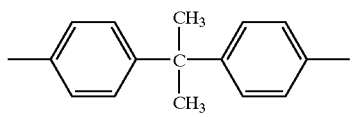

and n represents a polymerization degree)

As the polyester-series resins having at least one ethylenic double bond, there can also be used a resin obtaind by esterifying with (meth)acrylic acid at least one end of a copolymer having OH groups at both ends obtained by polycondensation or polyaddition and polycondensation between phthalic acid or isophthalic acid or an anhydride thereof and a glycol (ethylene glycol, propylene glycol, etc.).

As the polyester-series resins having at least one ethylenic double bond, there can also be used a resin obtaind by reaction between the above-mentioned unsaturated polyester resin and glycidyl (meth)acrylate through the end OH group or end carboxyl group of the unsaturated polyester resin and the glycidyl group.

The molecular weight of the polyester-series resins having at least one ethylenic double bond as mentioned above is preferably on the order of 1,000 to 100,000 when measured by gel permeation chromatography.

As the polyurethane-series resin having at least one ethylenic double bond, there can generally be used a resin obtaind by reacting a polyurethane resin having NCO groups at both ends obtained by polyaddition reaction between a polyisocyanate having two or more (usually two) of isocyanato groups and a polyol having two or more (usually two) of active hydrogen atoms with a compound having an ethylenic double bond and an OH group together in the molecule between the NCO group and the OH group.

As the polyisocyanate and the polyol, there can be used polyisocyanates and polyols, respectively, mentioned in the description of the polyurethane resin having an elongatedness of dry film of 100% or more of the above (A).

As the compound having an ethylenic double bond and an OH group together in the molecule, there can be mentioned 2-hydroxyethyl (meth)acrylate, 3-hydroxypropyl(meth)acrylate, N-methylol(meth)acrylamide, 2-hydroxyethyl-o-xylylene(meth)acrylate, 3-hydroxypropyl-o-xylylene(meth)acrylate, trimethylolpropane diallyl ether, etc.

As the polyurethane-series resin having at least one ethylenic double bond, there can also be used a resin represented by the following general formula obtained by urethanizing hydroxyethylphthaloyl methacrylate with xylylene diisocyanate.

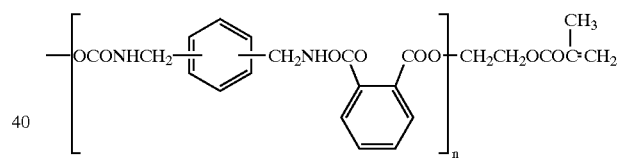

(wherein n represents a polymerization degree)

As the polyurethane-series resin having at least one ethylenic double bond, there can also be used a resin represented by the following general formula obtained by urethanizing trimethylolpropane diallyl ether with tolylene-2,4-diisocyanate.

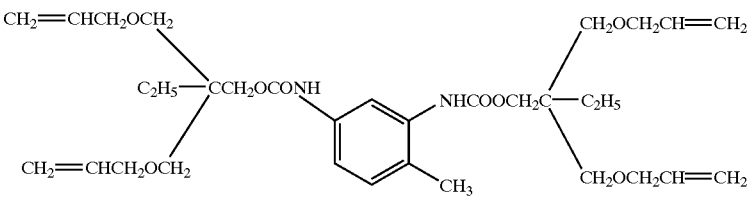

The molecular weight of the polyurethane-series resins having at least one ethylenic double bond as mentioned above is preferably on the order of 600 to 1,000,000 when measured by gel permeation chromatography.

As the synthetic resin having at least one ethylenic double bond of (B), there can also be used polyvinyl alcohol-series resins, polyamide-series resins, poly(meth)acrylic acid-series resins, (meth)acrylic acid-maleic acid copolymer-series resins, silicone resins, etc. having at least one ethylenic double bond.

As the diallyl phthalate-series resin as one of the synthetic resins having at least one ethylenic double bond of (B), there can also be used a homopolymer of diallyl phthalate or diallyl isophthalate or a copolymer of both. The molecular weight of the diallyl phthalate-series resin is preferably on the order of 2,000 to 1,000,000 when measured by gel permeation chromatography. As the polyurethane resin having an elongatedness of dry film of 100% or more and having at least one ethylenic double bond of (C), there can be used, among polyurethane-series resins having at least one ethylenic double bond mentioned in the description of the above (B), those having an elongatedness of dry film of 100% or more.

As commercial products of (C), there can be used R-5000 (water dispersion of a polyurethane acrylate, elongatedness 340%, made by DAI-ICHI KOGYO SEIYAKU CO., LTD.), etc.

As to the mutual ratio of the resins (A), (B) and (C), it is necessary that (A)+(C) is 50 to 100% by weight, and (B)+(C) is 0.1 to 100% by weight based on the resins (A)+(B)+(C). When (A)+(C) is less than 50% by weight, the slippage and abrasion resistance of the film surface necessitated at the time of forming get insufficient, and when (B)+(C) is less than 0.1% by weight, the adhesion of UV-curable paints, inks or adhesives gets insufficient. (A)+(C) is preferably 60 to 100% by weight, and (B)+(C) is preferably 5 to 100% by weight.

As to the total concentration of the resins (A), (B) and (C) in the aqueous coating composition for metal sheets of the invention, there is no particular limitation, but when it is too low, it gets difficult to form necessary film when applied, and when it is too high, it gets difficult to maintain the composition as water dispersion, and the proper total concentration is on the order of 5 to 70% by weight, particularly on the order of 10 to 60% by weight.

The aqueous coating composition for metal sheets of the invention does not contain any photopolymerization initiator. In the invention, the photopolymerization initiator is assumed to mean a substance forming a radical polymerization-activating substance or an ionic polymerization-activating substance initiating polymerization or crosslinking of monomer(s) having an ethylenic double bond by exposure to light, particularly ultraviolet rays. UV-curable paints, inks or adhesives contain a photopolymerization initiator at least at the time of use, and the aim of the invention is to ensure adhesion between the films by making the double bonds in the undercoat film formed from the composition of the invention participate at the time of chain polymerization initiated by the photopolymerization initiator.

Film obtained by applying onto a metal sheet the aqueous coating composition for metal sheets of the invention containing the resin (C) alone or two or more of the resins (A), (B) and (C) and not containing a photopolymerization initiator shows good adhesion of UV-curable top coatings, in addition to good formability, good corrosion resistance and good durability with injury.

When the aqueous coating composition for metal sheets of the invention containing the resin (C) alone or two or more of the resins (A), (B) and (C) further contains (D) a water dispersible wax in a range of 0.1 to 20% by weight of the total solid components, the formed film shows good lubricity even at the time of strong forming such as bending, drawing or punching of metal sheets, in addition to goodness of the above various characteristics, and gives good formability to the metal sheets.

As examples of the water dispersible wax, there can be mentioned paraffin wax, microcrystalline wax, montan wax, carnauba wax, rice bran wax, Japan wax, beeswax, spermaceti, lanolin, fatty acid amide wax, Sasol wax, polyethylene wax, oxidized polyethylene wax, etc. Preferred among them are polyethylene wax and oxidized polyethylene wax.

The water dispersible wax is used after being dispersed as particles in water by a physical method, a chemical method or a combined method thereof, and water dispersions thereof are sold on the market.

It is necessary that the content of this water dispersible wax is in a range of 0.1 to 20% by weight of the total solid components including itself in the aqueous coating composition for metal sheets of the invention. When the content of the water dispersible wax in the total solid components goes beyond 20% by weight, lowering of adhesion of UV-curable top coatings and shortage of film strength occur. When the content is less than 0.1% by weight, only insufficient formability can be given to the treated metal sheet in the case of strong forming.

In the invention, the total solid components are assumed to mean the total of the resins (A), (B) and (C), the water dispersible wax (D) and the the water insoluble fine particles having a Mohs hardness of 2.5 or more (E).

When the aqueous coating composition for metal sheets of the invention containing the resin (C) alone or two or more of the resins (A), (B) and (C) or containing the water dispersible wax (D) in addition thereto further contains (E) water insoluble fine particles having a Mohs hardness of 2.5 or more in a rate of 30% by weight or less of the total solid components, coating film formed using it gives, in addition to showing good formability, good corrosion resistance, good durability with injury and good adhesion of UV-curable top coatings, better durability with injury to the metal sheet.

When the Mohs hardness is less than 2.5, the durability with injury enhancing effect cannot be shown. When the Mohs hardness is more than 7, durability with injury is better, but the surface of a metal mold used in forming after the surface treatment may sometimes be damaged depending on the material of the metal mold, and the Mohs hardness is preferably in the range of 2.5 to 7.

The water insoluble fine particles are not particularly limited so long as they satisfy the above Mohs hardness condition. As specific examples, there can be mentioned diatom earth, silica, alumina, quartz, titanium dioxide, glass, calcium carbonate, mica, iron, nickel, stainless steel, iron oxide, metal oxides, aluminum, etc.

The content of the water insoluble fine particles needs to be 30% by weight or less of the total solid components including themselves in the aqueous coating composition for metal sheets of the invention. When the content goes beyond 30% by weight, the lubricity at forming such as bending, drawing or punching of the metal sheet on which film was formed using the composition and the film strength get poor. When this content is less than 5% by weight, there may possibly occur the case where the effect to prevent the surface from being injured by external force is not enough. Thus, the content of the water insoluble fine particles is preferably 5 to 30% by weight.

The aqueous coating composition for metal sheets of the invention can, if necessary, contain various known additives such as extender pigments, colorants, electrically conducting agents, leveling agents, antifoaming agents, suspending agents or thickeners.

The aqueous coating composition for metal sheets of the invention can be prepared by dispersing the respective components in water. As the water, deionized water, etc. can be used. When the resins (A), (B) and (C) and the water dispersible wax used in the invention can be utilized as water dispersion, they can be used as such.

The aqueous coating composition for metal sheets of the invention can be applied onto various metal sheets such as cold rolled steel sheets, hot rolled steel sheets, stainless steel sheets, various zinc-series or aluminum-series plated steel sheets and aluminum or aluminum alloy sheets.

Such a metal sheet is, usually, cleaned with a solvent detergent or an alkaline or acidic aqueous detergent, and, if necessary, subjected to known undercoating treatment such as chromate treatment, iron phosphate treatment, zinc phosphate treatment, titanium phosphate treatment, zirconium phosphate treatment or organic film treatment for giving corrosion resistance, top coating adhesion, adhesion after processing etc.

Then, the composition of the invention is applied to the surface of a metal sheet. This application can be made by roll coating, dip coating, bar coating, flow coating, spray coating, brush coating, etc. After the coating, the film is dried, but this drying should be completed by volatilization of the solvent through air drying or drying by heating, and Uv curing using a photopolymerization initiator should not be carried out. When UV curing using a photopolymerization initiator is carried out, the ethylenic double bond sites contained in the aqueous coating composition of the invention are consumed in reaction and bonding, and it gets impossible to heighten adhesion of UV-curable paints, inks or adhesives as top coatings.

The amount of the dry film varies depending on the final use, but roughly 0.3 to 20 $g/m^2$ is appropriate. When the amount is lower than 0.3 $g/m^2$, it is impossible to attain all of good top coating adhesion, good formability, good corrosion resistance and good durability with injury. When the amount is higher than 20 $g/m^2$, processability gets insufficient and it is not economical.

It is also possible to give functions such as designing properties, discriminating properties, corrosion resistance or adhesiveness onto the whole or part of the surface having the film formed by the aqueous coating composition for metal sheets of the invention by forming film of a UV-curable paint, ink or adhesive. As the UV-curable paint, ink or adhesive, there can be used conventional ones without particular limitation.

UV curing is a method which comprises photopolymerizing a paint, ink, adhesive, etc. and curing and drying the resutant matter in a short time by utilizing the chemical energy of ultraviolet rays. Therein, photosensitive molecules contained in the paint, ink or adhesive absorb ultraviolet rays in the presence of the photopolymerization initiator, and are polymerized and solidified. Namely, the UV-curable paint, ink or adhesive is a paint, ink or adhesive containing a photosensitive macromolecule and a photopolymerization initiator, supposed to be applied to the method.

Metal sheets having film formed by the aqueous coating composition of the invention are, in many cases, subjected to processing such as bending, deep drawing, extrusion and/or punching to be parts for household appliances, automobiles as its final uses.

The polyurethane resin having an elongatedness of dry film of 100% or more which the aqueous coating composition for metal sheets of the invention contains forms polyurethane resin film after being applied to the surface of a metal sheet as material to be coated and dried, and gives slippage, abrasion resistance, etc. of the film surface needed at forming of the metal sheet. At that time, the synthetic resin having at least one ethylenic double bond contained in the aqueous coating composition of the invention is entangled with the polyurethane resin, and contained in the fixed state in the formed polyurethane resin film. When the polyurethane resin having an elongatedness of dry film of 100% or more and having at least one ethylenic double bond is used, the above fixed state is formed as itself. Since the aqueous coating composition of the invention does not contain any photopolymerization initiator, even when it was made into film on the surface of material to be coated, the film still has ethylenic double bonds. Thus, not a few ethylenic double bonds exist on the film surface, and, if a photopolymerization initiator and ultraviolet rays and ethylenic double bonds as a partner for polymerization exist, they can cause photoreaction. When a UV-curable ink or paint containing as a main component a monomer or oligomer also having ethylenic double bonds is applied onto such surface and cured with application of ultraviolet rays, the ethylenic double bonds begin to polymerize by the action of the photopolymerization initiator contained in the UV-curable paint, ink or adhesive, and, by chain reaction, the UV-curable paint, ink or adhesive gets high molecular, including bonding with the ethylenic double bond in the undercoat film by the aqueous coating composition of the invention, whereby curing of the top coating is completed. The thus formed UV-curable top coating film has strong chemical bonds between the layers and can display good adhesion.

The water dispersible wax used in the invention is, if desired, incorporated into the aqueous coating composition for metal sheets of the invention in accordance with the purpose of use. The case to need its incorporation is, for example, a case where the resultant coated metal sheet is subjected to strong processing such as deep drawing forming, and the wax exists on or in the formed film and gives characteristics such as low deformation resistance and low surface energy, and thereby further enhances formability. Generally, when waxes exist on the surface, they make surface energy low and exist as a surface weakening layer, and therefore, top coating adhesion tends to be poor. However, since a water dispersible wax is used in the invention, the two dimensional structure of the surface of the formed film is such that the film surface formed with entanglement of the polyurethane resin having an elongatedness of dry film of 100% or more and the synthetic resin having at least one ethylenic double bond contained in the aqueous coating composition of the invention, or the film surface formed from the polyurethane resin having an elongatedness of dry film of 100% or more and having at least one ethylenic double bond is exposed from voids of dotted wax particles. Since the ethylenic double bonds exist on the exposed surface and can cause photoreaction, even in the presence of the water dispersible wax, it is possible to form strong chemical bonding with the top coating film and display good adhesion.

Further, when the water insoluble fine particles having a Mohs hardness of 2.5 or more are incorporated into the aqueous coating composition for metal sheets of the invention, as is the case with the water dispersible wax, the two dimensional structure of the surface of the formed film is such that the film surface formed with entanglement of the polyurethane resin having an elongatedness of dry film of 100% or more and the synthetic resin having at least one ethylenic double bond contained in the aqueous coating composition of the invention, or the film surface formed from the polyurethane resin having an elongatedness of dry film of 100% or more and having at least one ethylenic double bond contained therein is exposed from voids of the dotted water insoluble fine particles, and thereby good adhesion can be displayed. Futher, if a sharp-edged material body contacts with the film surface, the water insoluble fine particles can contact therewith and prevent the film from being injured.

EXAMPLE

The invention is more specifically described below according to examples and comparative examples, but the scope of the invention should not be limited by these examples.

The test methods used in the examples and the comparative examples are as follows.

1. Aqueous Coating Composition for Metal Sheets

Aqueous coating compositions for metal sheets used in the examples and comparative examples are shown in Table 1.

Each aqueous coating composition for metal sheets was prepared by adding (A), (B), (C), (D) and (E) in this order to deionized water while stirring the deionized water strongly but so as not to foam by a magnetic stirrer, and adjusting the concentration of (A)+(B)+(C) to 25% by weight. In the case where a photopolymerization initiator was added, it was added immediately before coating (namely after (E)).

TABLE 1

Aqueous coating compositions for metal sheets [%: % by weight in total solid components]

| | (A) Polyurethane resin | | (B) Ethylenic double bond - containing synthetic resin | | (C) Ethylenic double bond - containing polyurethane resin | | (D) Water dispersible wax | | (E) Water insoluble fine particles | | Photo-polymerization initiator | |
|---|---|---|---|---|---|---|---|---|---|---|---|---|
| | Kind | % | Kind | % | Kind | % | Kind | % | Kind | % | Kind | % |
| Composition of the invention | | | | | | | | | | | | |
| a | HYDRAN HW-340 | 80 | LAROMER LR 8765 | 20 | — | — | — | — | — | — | — | — |
| b | HYDRAN HW-312B | 50 | — | — | R-5000 | 50 | — | — | — | — | — | — |
| c | — | — | NEW FRONTIER PET-3 | 30 | R-5000 | 70 | — | — | — | — | — | — |
| d | HYDRAN HW-950 | 60 | LAROMER LR 8765 | 10 | R-5000 | 30 | — | — | — | — | — | — |
| e | — | — | — | — | R-5000 | 100 | — | — | — | — | — | — |
| f | PERMARIN UA-110 | 75 | NEW FRONTIER PET-3 | 25 | — | — | Wax a | 5 | — | — | — | — |
| g | PERMARIN UA-310 | 40 | — | — | R-5000 | 40 | — | — | Fine particles a | 20 | — | — |
| h | — | — | — | — | R-5000 | 60 | Wax b | 15 | Fine particles c | 25 | — | — |
| Comparative composition | | | | | | | | | | | | |
| i | HYDRAN HW-340 | 100 | — | — | — | — | — | — | — | — | — | — |
| j | HYDRAN HW-312B | 70 | LAROMER LR 8765 | 27 | — | — | — | — | — | — | Initiator a | 3 |
| k | HYDRAN HW-350 | 70 | LAROMER LR 8765 | 30 | — | — | — | — | — | — | — | — |
| l | — | — | — | — | R-5000 | 75 | Wax a | 25 | — | — | — | — |
| m | HYDRAN HW-950 | 40 | — | — | R-5000 | 25 | — | — | Fine particles b | 35 | — | — |

<Explanation of Table 1>
Polyurethane Resin (A)
  HYDRAN HW-340
    Trade name, made by DAINIPPON INK AND CHEMICALS, INC., Water dispersion of polyester-type polyurethane, elongatedness 280%
  HYDRAN HW-312B
    Trade name, made by DAINIPPON INK AND CHEMICALS, INC., Water dispersion of polyether-type polyurethane, elongatedness 700%
  HYDRAN HW-950
    Trade name, made by DAINIPPON INK AND CHEMICALS, INC., Water dispersion of polyester-type polyurethane, elongatedness 120%
  PERMARIN UA-110
    Trade name, made by SANYO CHEMICAL INDUSTRIES, LTD., Water dispersion of polyether-type polyurethane, elongatedness 500%
  PERMARIN UA-310
    Trade name, made by SANYO CHEMICAL INDUSTRIES, LTD., Water dispersion of polyester-type polyurethane, elongatedness 420%
  HYDRAN HW-350
    Trade name, made by DAINIPPON INK AND CHEMICALS, INC., Water dispersion of polyester-type polyurethane, elongatedness 10%
Ethylenic Double Bond-containing Synthetic Resin (B)
  LAROMER LR8765
    Trade name, made by BASF Japan, an aliphatic epoxy resin-type ethylenic double bond-containing resin
  NEW FRONTIER PET-3
    Trade name, made by DAI-ICHI KOGYO SEIYAKU CO., LTD., a polyester-type ethylenic double bond-containing resin
Ethylenic Double bond-containing Polyurethane Resin (C)
  R-5000
    Trade name, made by DAI-ICHI KOGYO SEIYAKU CO., LTD., a polyurethane-type ethylenic double bond-containing resin, elongatedness 340%
Water Dispersible Wax (D)
  Wax a
    CHEMIPEARL W-950, trade name, made by MITSUI CHEMICALS, INC., Water dispersion of polyethylene-type wax
  Wax b
    Hoechstwax PED 522, trade name, made by Hoechst Japan Co., Ltd., Polyethylene oxide-type wax
Water Insoluble Fine Particles (E)
  Fine Particles a
    SILLITIN Z-89, trade name, made by HOFFMANN MINERAL CO., Mixture of particles of a Mohs hardness of 7.0 and particles of a Mohs hardness of 2.5
  Fine Particles b
    DENTALL WK200, trade name, made by Otsuka Pharmaceutical Co., Ltd., Mohs hardness 4.0 to 5.0
  Fine Particles c
    KURALITEMICA 600-W, trade name, made by KURARAY CO., LTD., Mohs hardness 2.5
Photopolymerization Initiator
  Initiator a
    ESACURE KIP100F, trade name, made by Fratelli Lanberti s.p.a., Hydroxyketone olygomer photopolymerization initiator 2. Surface Treatment Method
1) Material to be Tested and Undercoating Treatment
  A) Aluminum Alloy Sheet
    Test pieces (sheet thickness 1.0 mm) composed of a commertially available A-5052 aluminum sheet were pretreated according to the following steps and used.
    ① Degreasing: The test pieces were spray degreased with "Finecleaner 4498SK" made by Nihon Parkerizing Co., Ltd. at 55° C. for 10 seconds.
    ② Washing with water: Spray washing was made with tap water for 15 seconds.
    ③ Chromate treatment: Chromate treatment of a surface Cr adhesion amount of 15 $mg/m^2$ was made by spraying "Alchrom K-702" made by Nihon Parkerizing Co., Ltd. at 55° C. for 7 seconds.
    ④ Dry off: Dry of f was made in an electric oven at 80° C. for 5 minutes.
  B) Galvanized Steel Sheet
    Test pieces (galvanized amount 20/20$g/m^2$, sheet thickness 0.8 mm) composed of a commertially available electrically galvanized steel sheet were pretreated according to the following steps and used.
    ① Degreasing: The test pieces were spray degreased with "Finecleaner 4336" made by Nihon Parkerizing Co., Ltd. at 60° C. for 20 seconds.
    ② Washing with water: Spray washing was made with tap water for 15 seconds.
    ③ Chromate treatment: Chromate treatment of a surface Cr adhesion amount of 15 $mg/m^2$ was made by spraying "Zinchrom 357" made by Nihon Parkerizing Co., Ltd. at 50° C. for 5 seconds.
    ④ Dry off: Dry off was made in an electric oven at 80° C. for 5 minutes.
2) Surface Treatment
  Each of the test sheets on which the above undercoating treatment was made was surface-treated with one of the aqueous coating compositions for metal sheets shown in Table 1 according to the following method.

Example 1

The aqueous coating composition a was applied onto the test sheet by air spray coating so that the dry film weight could be 5.0 $g/m^2$, and dried at 120° C. for 2 minutes in an electric oven (test sheet: aluminum alloy sheet).

Example 2

The aqueous coating composition b was applied onto the test sheet by roll coating so that the dry film weight could be 0.6 $g/m^2$, and dried at 230° C. for 20 seconds in an electric oven (test sheet: aluminum alloy sheet).

Example 3

The aqueous coating composition c was applied onto the test sheet by bar coating so that the dry film weight could be 3.0 $g/m^2$, and dried at 120° C. for 2 minutes in an electric oven (test sheet: aluminum alloy sheet).

Example 4

The aqueous coating composition d was applied onto the test sheet by dipping so that the dry film weight could be 1.0 $g/m^2$, and dried at 120° C. for 2 minutes in an electric oven (test sheet: aluminum alloy sheet).

Example 5

The aqueous coating composition e was applied onto the test sheet by roll coating so that the dry film weight could be 2.0 g/m², and dried at 230° C. for 20 seconds in an electric oven (test sheet: aluminum alloy sheet).

Example 6

The aqueous coating composition f was applied onto the test sheet by roll coating so that the dry film weight could be 2.0 g/m², and dried at 120° C. for 20 seconds in an electric oven (test sheet: galvanized steel sheet).

Example 7

The aqueous coating composition g was applied onto the test sheet by roll coating so that the dry film weight could be 1.0 g/m², and dried at 180° C. for 2 minutes in an electric oven (test sheet: aluminum alloy sheet).

Example 8

The aqueous coating composition h was applied onto the test sheet by roll coating so that the dry film weight could be 2.0 g/m², and dried at 120° C. for 20 seconds in an electric oven (test sheet: aluminum alloy sheet).

Comparative Example 1

The aqueous coating composition i was applied onto the test sheet by roll coating so that the dry film weight could be 2.0 g/m², and dried at 230° C. for 20 seconds in an electric oven (test sheet: aluminum alloy sheet).

Comparative Example 2

The aqueous coating composition j was applied onto the test sheet by roll coating so that the dry film weight could be 2.0 g/m², and dried at 120° C. for 20 seconds in an electric oven (test sheet: aluminum alloy sheet).

Comparative Example 3

The aqueous coating composition k was applied onto the test sheet by roll coating so that the dry film weight could be 2.0 g/m², and dried at 230° C. for 20 seconds in an electric oven (test sheet: galvanized steel sheet).

Comparative Example 4

The aqueous coating composition 1 was applied onto the test sheet by roll coating so that the dry film weight could be 2.0 g/m², and dried at 120° C. for 20 seconds in an electric oven (test sheet: aluminum alloy sheet).

Comparative example 5

The aqueous coating composition m was applied onto the test sheet by roll coating so that the dry film weight could be 2.0 g/m², and dried at 230° C. for 20 seconds in an electric oven (test sheet: aluminum alloy sheet).

Comparative example 6

No surface treatment was conducted (test sheet: aluminum alloy sheet).

3. Test Methods

1) Printability of UV-curable Top Coating

Top coating agent: "RIG BLACK No. 10" (made by SEIKO ADVANCE Co., Ltd.)

Coating method: #240 silk screen, mat printing

Curing method: UV irradiation (lamp output 120w/cm) 8 seconds

Evaluation method: Cellophane tape was stuck and made to adhere on the surface of each of the test pieces after the overprinting and quickly peeled off, the printed surface after the peeling was observed, and judgment and evaluation were made based on the following judgment criterion.

○:No peeling of the ink
Δ:Partial peeling of the ink
X :Entire peeling

2) Corrosion Resistance

Evaluation method: Each of the test pieces was subjected to 180-degree bending of 2t and immersed in boiling tap water for 30 minutes, the apperance of the processed part was observed, and judgment and evaluation were made based on the following judgment criterion.

○:No black discoloration
Δ:Partial black discoloration
X :Apparent black discoloration 3) Surface Lubricity Evaluation method: Surface dynamic friction coefficient ($\mu[-]$) was measured using a Bouden-Leben type friction and wear tester, and evaluation was made thereby.

4) Durability with injury

Evaluation method: The pencil scratch test prescribed in JIS-K-5400 was made, and evaluation was made by pencil hardness at the time when conspicuous injury was observed.

The results of evaluation carried out according to the above test procedures were shown in Table 2.

TABLE 2

|  | Printing adhesion | Corrosion resistance | Surface lubricity | Durability with injury |
|---|---|---|---|---|
| Example 1 | ○ | ○ | 0.20 | 3 H |
| Example 2 | ○ | ○ | 0.37 | 2 H |
| Example 3 | ○ | ○ | 0.22 | 3 H |
| Example 4 | ○ | ○ | 0.25 | 3 H |
| Example 5 | ○ | ○ | 0.38 | 3 H |
| Example 6 | ○ | ○ | 0.10 | 4 H |
| Example 7 | ○ | ○ | 0.23 | 5 H |
| Example 8 | ○ | ○ | 0.04 | 6 H |
| Comparative example 1 | X | ○ | 0.35 | 3 H |
| Comparative example 2 | X | ○ | 0.34 | 3 H |
| Comparative example 3 | ○ | X | 0.28 | 3 H |
| Comparative example 4 | Δ | Δ | 0.03 | 2 H |
| Comparative example 5 | Δ | X | 0.49 | 4 H |
| Comparative example 6 | Δ | X | 0.78 | 2 H |

(Explanation of the table)
Printing adhesion . . . Evaluation of ○ is required.
Corrosion resistance . . . Evaluation of ○ is required.
Surface lubricity . . . There is a case where a value of 0.15 or less is required depending on the kind of forming.
Durability with injury . . . There is a case where a hardness of 5 H or more is required on the purpose of use.

As apparent from the results of Table 2, in Examples 1 to 8 using the aqueous coating compositions for metal sheets of the invention, the resultant films were excellent in both adhesion of the UV-curable top coating and corrosion resistance, and had good surface lubricity and durability with injury. Further, in Example 6 wherein the water dispersible wax was incorporated for further improvement of surface lubricity, in Example 7 wherein the water insoluble fine particles were incorporated for further improvement of durability with injury, and in Example 8 wherein both of the water dispersible wax and the water insoluble fine particles were incorporated for further improvement of surface lubricity and for further improvement of durability with injury, respectively, bad influence on top coating adhesion and corrosion resistance was not recognized, and good performance was noted.

On the other hand, in Comparative example 1, since the resin having ethylenic double bond ((B) or (C)) was not used, top coating adhesion was not sufficient. In Comparative example 2, since the photopolymerization initiator was added, either the ethylenic double bonds in the film photopolymerized before application of the UV-curable top coating, or many of the ethylenic double bonds in the film were consumed by their mutual reaction at the time of curing of the UV-curable top coating, and thus enough surface ethylenic double bonds did not remain, and as a result, the film was poor in top coating adhesion. In Comparative example 3, a polyurethane resin having an elongatedness of less than 100% was used, and therefore, the film was poor in corrosion resistance. In Comparative example 4, the water dispersible wax was incorporated in an amount of more than 20% by weight based on the total solid components, and therefore, the film was poor in top coating adhesion and corrosion resistance. In Comparative example 5, the water insoluble fine particles were incorporated in an amount of more than 30% by weight based on the total solid components, and therefore, film strength was lost and the film was poor in performance. In Comparative example 6, the surface treatment of the invention was not carried out, and therefore, the film was extremely poor in surface lubricity, and the level was such that forming could not be made without application of an oil even in any light processing.

On the surface of metal sheets treated with the aqueous coating composition of the invention, slippage of the film surface required at processing is given due to the characteristic of the polyurethane resin. Further, since either the synthetic resin having ethylenic double bonds is contained in such a state that it is entangled with the polyurethane resin and fixed or the polyurethane resin itself has ethylenic double bonds, and the composition does not contain any photopolymerization initiator, when a UV-curable paint, ink or adhesive is applied onto the film and cured with ultraviolet rays, the UV-curable paint, ink or adhesive is polymerized, including linkage to the ethylenic double bonds which the film contains, to give good adhesion. When the water dispersible wax is properly used according to use purpose, the film can further have an effect that such surface lubricity is given that strong processing such as deep drawing forming is made possible, while good adhesion is maintained due to the action of the ethylenic double bonds which the undercoat film by the aqueous coating composition of the invention has and which were contacting with the top coating at the voids among the dotted wax particles. Further, by adding water insoluble fine particles having a Mohs hardness of 2.5 or more, the film can further have excellent characteristic that when a sharp material body contacts with the film, the water insoluble fine particles contact therewith to prevent the film from being injured, while good adhesion is maintained as in the above.

What is claimed is:

1. An aqueous coating composition for metal sheets which comprises, as indispensable components, the following (C) alone or two or more of the following (A), (B) and (C), (D) a water dispersible wax and water, and does not contain a photopolymerization initiator:

(A) a polyurethane resin having an elongatedness of dry film of 100% or more (excluding the following (C))

(B) a synthetic resin having at least one ethylenic double bond (excluding the following (C))

(C) a polyurethane resin having an elongatedness of dry film of 100% or more and having at least one ethylenic double bond, the synthetic resin (B) being an epoxy-series resin, a polyester-series resin, a polyurethane-series resin, a polyvinyl alcohol-series resin, a polyamide-series resin, a poly (meth)acrylic acid-series resin, a (meth) acrylic acid-maleic acid copolymer-series resin or a silicone resin having at least one ethylenic double bond, or a diallyl phthalate-series resin, based on the total of the resins (A), (B) and (C), the total of (A) and (C) being 50 to 100% by weight and the total of (B) and (C) being 0.1 to 100% by weight, and the content of the water dispersible wax (D) being 0.1 to 20% by weight of the total solid components.

2. The composition according to claim 1 wherein the water dispersible wax (D) is paraffin wax, microcrystalline wax, montan wax, carnauba wax, rice bran wax, Japan wax, bees wax, spermaceti wax, lanolin, fatty acid amide wax, Sasol wax, polyethylene wax or oxidized polyethylene wax.

3. The composition according to claim 1 which further contains (E) water insoluble fine particles having a Mohs hardness of 2.5 or more in a rate of 30% by weight or less of the total solid components.

4. The composition according to claim 3 wherein the water insoluble fine particles having a Mohs hardness of 2.5 or more of (E) is diatom earth, silica, alumina, quartz, titanium dioxide, glass, calcium carbonate, mica, iron, nickel, stainless steel, iron oxide, a metal oxide or aluminum having a Mohs hardness of 2.5 or more.

5. A metal sheet having thereon film formed by applying and drying the composition according to claim 1.

6. The metal sheet according to claim 5 wherein the metal sheet is a cold rolled steel sheet, hot rolled steel sheets, stainless steel sheet, zinc-series plated steel sheet, aluminum-series plated steel sheet, aluminum sheet or aluminum alloy sheet.

7. A surface treating method for metal sheets which comprises coating the surface of a metal sheet with the composition according to claim 1, drying the applied composition and forming a film of an UV-curable paint, an UV-curable ink or an UV-curable adhesive on the whole or part of the resulting surface.

8. A metal sheet having thereon composite film formed by the surface treating method according to claim 7.

9. The metal sheet according to claim 8 wherein the metal sheet is a cold rolled steel sheet, hot rolled steel sheet, stainless steel sheet, zinc-series plated steel sheet, aluminum-series plated steel sheet, aluminum sheet or aluminum alloy sheet.

* * * * *